US010715662B2

(12) United States Patent
Bondareva et al.

(10) Patent No.: US 10,715,662 B2
(45) Date of Patent: *Jul. 14, 2020

(54) SYSTEM AND METHOD FOR ARTIFICIAL INTELLIGENCE ON HOLD CALL HANDLING

(71) Applicant: MOTOROLA SOLUTIONS, INC, Chicago, IL (US)

(72) Inventors: Mariya Bondareva, Bolingbrook, IL (US); Randy L. Ekl, Downers Grove, IL (US); David Kaleko, Oak Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,925

(22) Filed: Apr. 9, 2019

(65) Prior Publication Data
US 2019/0379788 A1 Dec. 12, 2019

Related U.S. Application Data

(63) Continuation of application No. 16/004,582, filed on Jun. 11, 2018, now Pat. No. 10,306,059.

(51) Int. Cl.
H04M 3/51 (2006.01)
H04M 3/428 (2006.01)
G06N 20/00 (2019.01)
G06Q 10/00 (2012.01)
G06Q 10/10 (2012.01)

(52) U.S. Cl.
CPC .......... H04M 3/5116 (2013.01); G06N 20/00 (2019.01); G06Q 10/00 (2013.01); G06Q 10/10 (2013.01); H04M 3/4283 (2013.01); H04M 3/4285 (2013.01); H04M 3/5166 (2013.01); H04M 2201/40 (2013.01); H04M 2242/04 (2013.01)

(58) Field of Classification Search
CPC ...... H04M 3/51; H04M 3/428; H04M 3/5175; H04M 3/5183; H04M 2203/402; H04M 3/5166; G06N 20/00
USPC ................. 379/45, 37–44, 265.03, 265.02
See application file for complete search history.

(56) References Cited

U.S. PATENT DOCUMENTS 4,834,551 A 5/1989 Katz
7,095,852 B2 8/2006 Wack et al.
(Continued)

FOREIGN PATENT DOCUMENTS

WO 2014134217 A1 9/2014

OTHER PUBLICATIONS

Velloso, Mat et al.: "Transition conversations from bot to human", https://docs.microsoft.com/en-us/azure/bot-service/bot-service-design-pattern-handoff-human?view=azure-bot-service-3.0, published: Dec. 13, 2017, downloaded from internet: May 29, 2018, all pages.
(Continued)

Primary Examiner — Melur Ramakrishnaiah

(57) ABSTRACT

Systems and methods of on hold handling of calls are provided. A call may be received, from a caller, at a public safety access point. An Artificial Intelligence (AI) bot may monitor a context associated with the call. The call may be placed on hold. The AI bot may determine, based on the context associated with the call, that the call should be taken off hold.

17 Claims, 5 Drawing Sheets

(56) References Cited

U.S. PATENT DOCUMENTS

| | | |
|---|---|---|
| 7,248,683 B2 | 7/2007 | Burg et al. |
| 9,438,730 B1 | 9/2016 | Lillard et al. |
| 10,009,467 B1* | 6/2018 | Valiente .............. H04M 3/5231 |
| 2002/0106059 A1* | 8/2002 | Kroll ...................... H04M 11/04 379/45 |
| 2003/0037146 A1 | 2/2003 | O'Neill |
| 2006/0122840 A1 | 6/2006 | Anderson et al. |
| 2008/0031426 A1 | 2/2008 | Weeks |
| 2010/0124900 A1 | 5/2010 | Lui et al. |
| 2012/0179982 A1 | 7/2012 | Gandhi et al. |
| 2013/0019321 A1 | 1/2013 | Ferren |
| 2014/0106699 A1 | 4/2014 | Chitre et al. |
| 2014/0140494 A1 | 5/2014 | Zhakov |
| 2016/0379470 A1 | 12/2016 | Shurtz |
| 2017/0289350 A1 | 10/2017 | Philbin |
| 2019/0068784 A1* | 2/2019 | Reddy .................. H04M 3/5116 |
| 2019/0325288 A1* | 10/2019 | Oyenan ............. H04M 3/42195 |

OTHER PUBLICATIONS

"ECaTS and SQLstream Deliver Cloud Platform for Real-Time 911 Call Analytics", https://www.newswire.com/news/ecats-and-sqlstream-deliver-cloud-platform-for-real-time-911-call-6539325, downloaded from internet: May 30, 2018, copyright 2004-2018, all pages.

"Live platform for streaming IP network and CDR analytics achieves real-time Fraud detection, rating, and least-cost routing", sqlstream, copyright 2017, http://sqlstream.com/wp-content/uploads/2017/07/CASE-STUDY-ecats.pdf, Downloaded from internet: May 30, 2018, all pages.

The International Search Report and the Written Opinion corresponding patent application No. PCT/US2019/035301 filed Jun. 4, 2019, dated Aug. 20, 2019, all pages.

* cited by examiner

SYSTEM AND METHOD FOR ARTIFICIAL INTELLIGENCE ON HOLD CALL HANDLING

BACKGROUND

Many localities around the world provide a system for the public to rapidly request assistance in case of an emergency. For example, in the United States of America the 9-1-1 system may be used to request assistance from police, fire, or emergency medical services (EMS) first responders by simply dialing 911 on any telephone, including both landline and wireless telephones. The United Kingdom provides similar functionality through the 9-9-9 system. Other localities may provide similar functionality through locally known emergency phone numbers.

Typically, calls to the emergency phone number are routed to a call center that may also be referred to as a public safety access point (PSAP). Some roles of personnel at a PSAP can include call taker (e.g. answering incoming calls), dispatchers (e.g. dispatching first responders such as police, fire, and EMS), translator, coordinator (e.g. coordinating between public safety and other agencies), records entry (e.g. transcribing information related to the call), and any number of other tasks. In many PSAPs, there is not a one to one mapping of role to an individual person. In some PSAPs, a single person may perform anywhere from one to all the responsibilities of each role. For example, a call taker may also act as a dispatcher as well as be responsible for coordinating with public safety and other agencies.

In some cases, a caller to a PSAP may be placed on hold while the call taker attends to other responsibilities. For example, a caller, such as a caller reporting an emergency, may be placed on hold while the call taker is dispatching first responders. As another example, the call taker may need to communicate with another agency to process the call (e.g. caller reporting downed power line, call taker puts caller on hold in order to communicate with electric company).

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
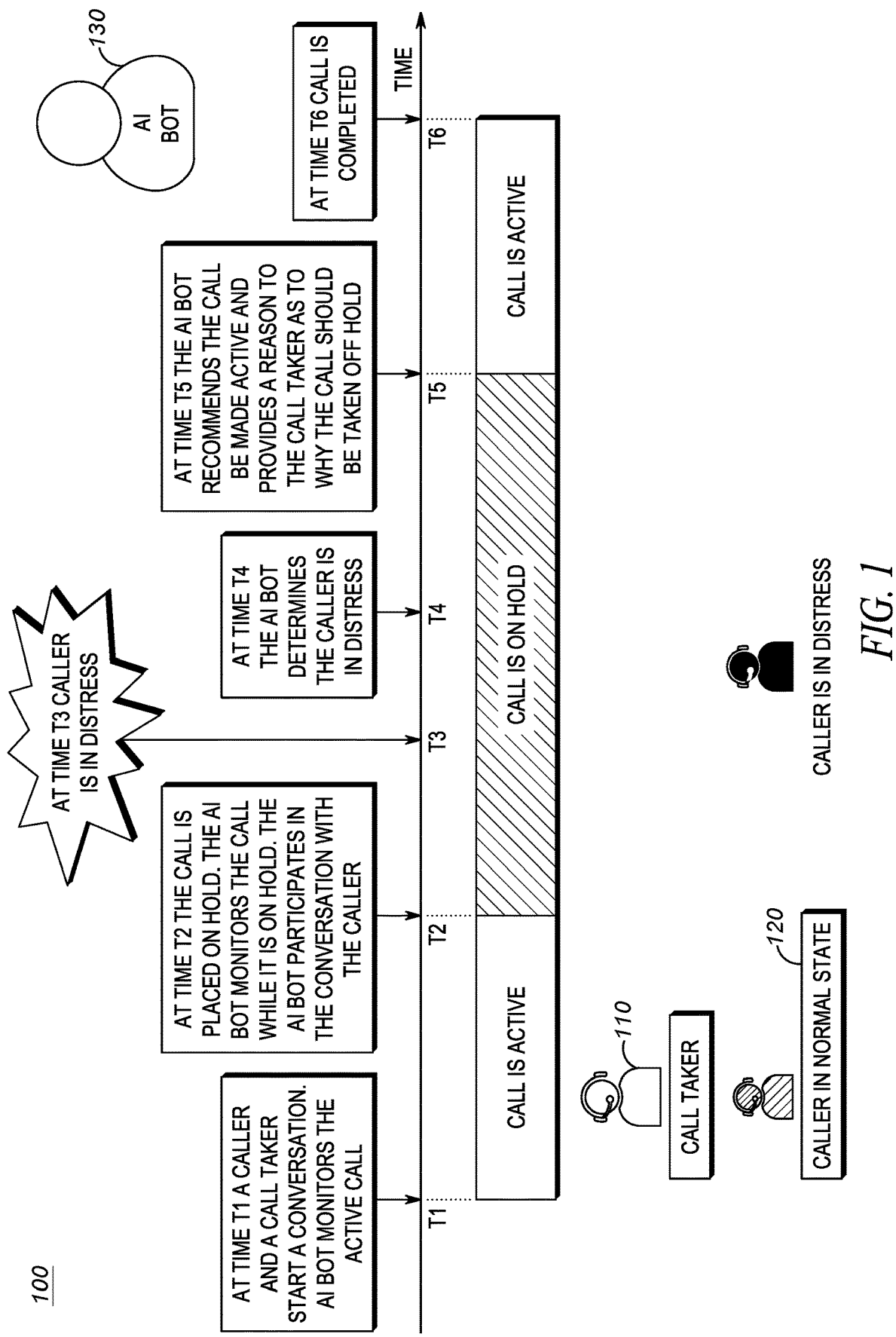
FIG. 1 is an example of a timeline using the artificial intelligence on hold call handling techniques described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

During times when a caller to a PSAP is on hold, there may be no one listening to incoming audio from the caller. A problem may arise if the caller's situation changes while they are on hold. For example, a caller may call a PSAP to report a suspicious large gathering of people. The caller may be placed on hold while the call taker attends to other matters (e.g. dispatching first responders to the location of the caller), which in turn means the call taker may not be listening to the caller. The situation may change while the caller is on hold. For example, the suspicious gathering of people may have evolved into a violent riot. The caller would not be able to inform the call taker of the change in situation until the call taker returns to the caller (e.g. takes the caller off hold).

In addition, there may be information that needs to be conveyed to the caller while the call is on hold. For example, in the suspicious gathering example being described, the PSAP may become aware that the caller's location is no longer safe and the caller should flee. Until the call taker is able to return to the caller, such instructions cannot be given to the caller. In addition, sounds from the caller's location that may be useful to public safety personnel may go unheard while the caller is on hold. For example, if there are gunshots in the caller's background sounds, such information might be immediately useful (e.g. first responders can be informed that shots have been fired in the area of the call). The call taker would not have access to such information while the call is on hold. Even after the call is taken off hold, conveying such information may require skills that are beyond the caller's capabilities (e.g. caller would first need to be capable of recognizing the sound of gunshots, and then have the presence of mind to relay that information to the call taker once the caller has been taken off hold).

Provided herein are systems and methods for on hold call handling using artificial intelligence. An Artificial Intelligence (AI) bot may monitor calls to a PSAP, including during periods of time that a caller has been placed on hold to detect changes in the caller's status, which may also be referred to as the caller's context. Depending on the nature of any context change detected, the AI bot may trigger the caller to be taken off hold. Information related to the caller's context may come from any number of sources and may be used by the AI bot when making the decision to take the call off hold. The AI bot may learn by receiving feedback related to the whether the decision to take the call off hold was correct or incorrect. This information may be used to train the AI bot for handling calls in the future.

An example method for on hold handling of calls is provided herein. The example method includes receiving a call, from a caller, at a public safety access point. The example method further includes monitoring, with an Artificial Intelligence (AI) bot implemented by a processor, a context associated with the call. The example method also includes placing the call on hold. The example method additionally includes determining, by the AI bot, based on the context associate with the call, that the call should be taken off hold.

In one aspect, monitoring the context associated with the call may comprise monitoring incoming audio from the caller. The monitoring may also include detecting a trigger in the incoming audio from the call. In another aspect, monitoring the context associated with the call may further comprise monitoring communications associated with the public safety access point. The monitoring may also include detecting a trigger within the public safety access point associated communications. In another aspect, monitoring the context associated with the call may further comprise monitoring external information sources. The monitoring may also include detecting a trigger in the external information sources.

The example method may further comprise taking the call off hold, wherein taking the call off hold may include connecting the caller to a call taker. The example method may further comprise taking the call off hold wherein taking the call off hold may include communicating, via the AI bot, information to the caller.

The example method may further comprise providing a recommendation, by the AI bot, to a call taker that the call should be taken off hold, wherein the recommendation includes a reason why the call should be taken off hold. The example method may further take the call off hold when the recommendation is accepted. The example method may also include providing an indication that the recommendation was correct or incorrect based on when the recommendation is accepted, wherein the AI bot updates historical data based on the indication in order to actively learn from the accuracy of the recommendation.

The example method may also include obtaining, by the AI bot, pertinent information from the caller while the call is on hold. The method may also include summarizing the pertinent information by the AI bot. The example method may additionally include providing the summarization to a call taker while the caller is on hold.

An example non-transitory processor readable medium containing a set of processor executable instructions thereon is provided. The instructions, when executed by a processor, cause the processor to receive a call, from a caller, at a public safety access point. The instructions further cause the processor to monitor, with an Artificial Intelligence (AI) bot, a context associated with the call. The instructions further cause the processor to place the call on hold. The instructions also cause the processor to determine, by the AI bot, based on the context associated with the call, that the call should be taken off hold.

In one aspect, the instructions to monitor the context associated with the call further comprises instructions to monitor incoming audio from the caller. The instructions further detect a trigger in the incoming audio from the call. In another aspect, the instructions to monitor the context associated with the call further comprises instructions to monitor communications associated with the public safety access point. The instructions further detect a trigger within the public safety access point associated communications. In another aspect the instructions to monitor the context associated with the call further comprises instructions to monitor external information sources. The instructions further detect a trigger in the external information sources.

The medium may also include instructions to take the call off hold wherein taking the call off hold includes connecting the caller to a call taker. The medium may also include instructions to take the call off hold wherein taking the call off hold includes communicating, via the AI bot, information to the caller.

The medium may also include instructions to provide a recommendation, by the AI bot, to a call taker that the call should be taken off hold, wherein the recommendation includes a reason why the call should be taken off hold. The medium may also include instructions to take the call off hold when the recommendation is accepted. The medium may also include instructions to provide an indication that the recommendation was correct or incorrect based on when the recommendation is accepted, wherein the AI bot updates historical data based on the indication in order to actively learn from the accuracy of the recommendation.

The medium may also include instructions to obtain, by the AI bot, pertinent information from the caller while the call is on hold. The medium may also include instructions to summarize the pertinent information by the AI bot. The medium may also include instructions to provide the summarization to a call taker while the caller is on hold.

An example system is provided. The system includes a processor and a memory coupled to the processor. The memory contains a set of instructions that when executed by the processor cause the processor to receive a call, from a caller, at a public safety access point. The memory also contains instructions that cause the processor to monitor, with an Artificial Intelligence (AI) bot, a context associated with the call. The memory also contains instructions that cause the processor to place the call on hold. The memory also contains instructions that cause the processor to determine, by the AI bot, based on the context associated with the call, that the call should be taken off hold.

In one aspect, the memory may further include instructions that cause the processor to provide a recommendation, by the AI bot, to a call taker that the call should be taken off hold, wherein the recommendation includes a reason why the call should be taken off hold. The memory may further include instructions to take the call off hold when the recommendation is accepted. The memory may further include instructions to provide an indication that the recommendation was correct or incorrect based on when the recommendation is accepted, wherein the AI bot updates historical data based on the indication in order to actively learn from the accuracy of the recommendation.

FIG. 1 is an example of a timeline using the artificial intelligence on hold call handling techniques described herein. Timeline 100 shown in FIG. 1 may include a call taker 110, a caller 120, and an Artificial Intelligence (AI) bot 130. Call taker 110 represents personnel at the PSAP that are responsible for handling incoming calls and communicating with caller 120. It should be understood that call taker 110 may have additional responsibilities other than just communicating with callers. For example, call taker 110 may also act as a dispatcher, records entry clerk, external agency coordinator, or any number of other roles.

Caller 120 may be a person who has contacted a PSAP for any number of reasons. For example, caller 120 may be experiencing an emergency (e.g. medical, fire, criminal) that requires an immediate response. Caller 120 may be calling the PSAP to report suspicious activity that may not necessarily require an immediate, or any response. The techniques described herein are applicable regardless of the reason caller 120 has called the PSAP.

AI bot 130 may be an active machine learning artificial intelligence bot that monitors incoming calls and other sources of information. AI bot 130 may monitor incoming calls, including those that have been placed on hold, to determine if a call should be taken off hold. AI bot actively learns by receiving feedback with respect to if its decision to take a call off hold was correct. Thus, the correctness of previous decisions is used to train AI bot 130 and improve its performance.

At time T1 caller 120 and call taker 110 start a conversation. The conversation is monitored by AI bot 130. As mentioned above, the caller may have called a PSAP call taker for any of a number of different reasons. AI bot 130 may monitor the call while the call taker 110 and caller are actively communicating. By doing so, AI bot 130 may be able to determine a baseline for the call. For example, AI bot 130 may be able to determine the baseline level of agitation of caller 120. AI bot 130 may also be able to determine a baseline of background noises being received from caller 120.

At time T2 the call may be placed on hold. For example, call taker 110 may place the call on hold to attend to other duties. AI bot 130 monitors the call while it is on hold. For example, AI bot 130 may monitor the call to determine if there is any change in the call base line. AI bot 130 may also participate in the conversation with the caller 120. For example, AI bot 130 may use an interactive voice response system to gather pertinent information, such as background information, from the caller.

At time T3 the caller may be in distress. Something may have changed in the caller's circumstances such that the caller 120 needs to communicate with the call taker 110 as soon as possible. For example, a caller 120 may have called the PSAP to report a suspicious person and was placed on hold. The suspicious person may have now obtained a gun and is shooting at caller 120, causing distress to the caller. Regardless of the particular circumstances, at time T3, the caller is now in distress.

At time T4 AI bot 130 may determine that the caller is in distress. In the current example, by monitoring the call, AI bot 130 may have detected the gunshots in the background noises from the caller. AI bot may also have detected a change in the level of agitation of the caller (e.g. a previously calm caller yells, "he's got a gun!!!"). As will be explained in further detail below, AI bot 130 may monitor various other internal and external sources in order to determine that the caller 120 is now in distress.

At time T5 AI bot 130 may recommend the call be made active (i.e. taken off hold) and provides a reason to the call taker 110 as to why the call should be taken off hold. In the current example, AI bot 130 may recommend the call be taken off hold and the reason given may be that gunshots were detected in background sounds. At this point, the call taker 110 has the option of taking caller 120 off hold and making the call active again. At time T6, the call may be completed.

Figure 2:
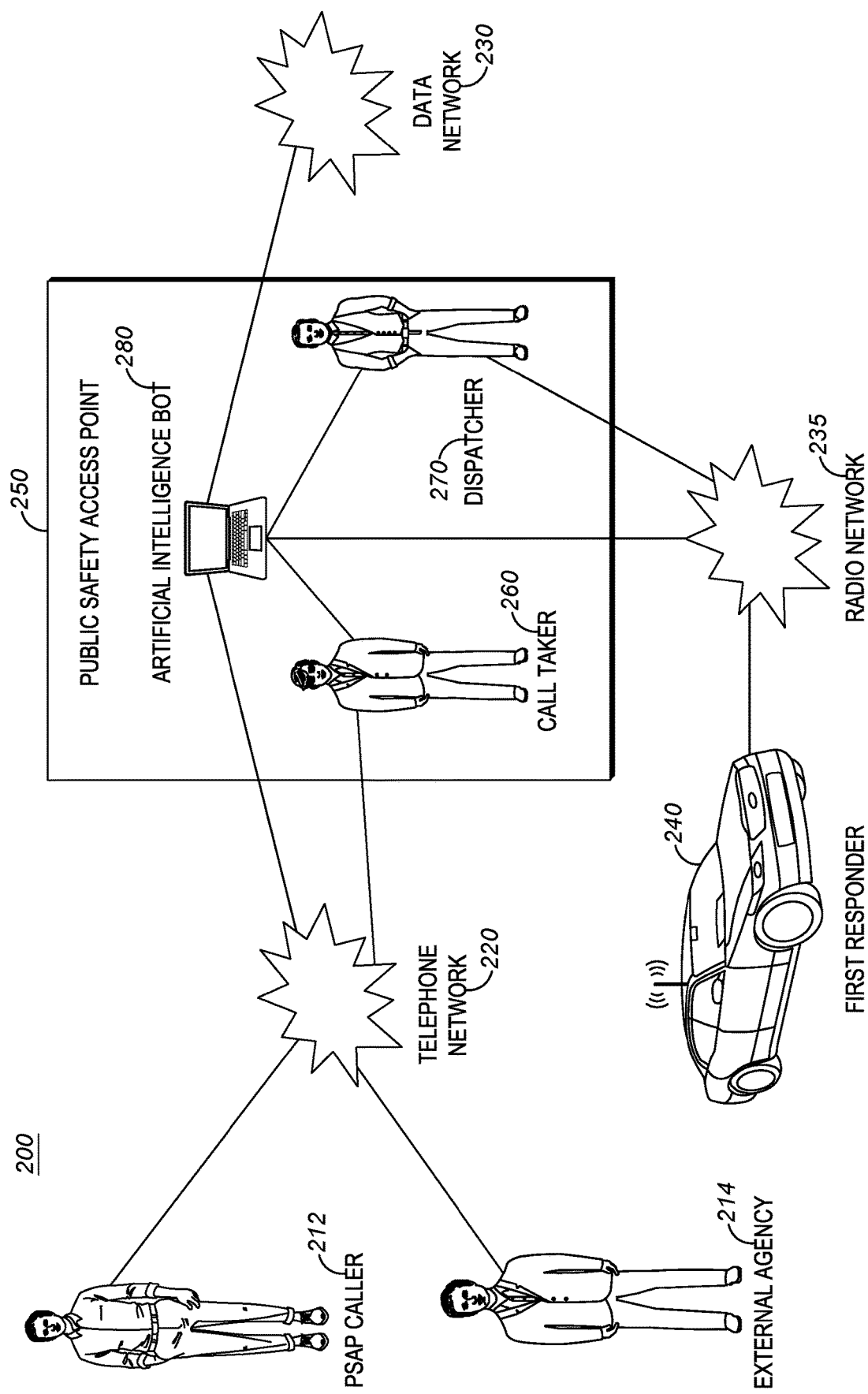
FIG. 2 is a block diagram of an example environment in which the techniques described herein may be used to handle on hold calls using artificial intelligence.

FIG. 2 is a block diagram of an example environment in which the techniques described herein may be used to handle on hold calls using artificial intelligence. Environment 200 may include PSAP Caller 212, external agency 214, first responder 240, Public Safety Access Point 250, call taker 260, dispatcher 270, artificial intelligence bot 280, telephone network 220, data network 230, and radio network 235.

PSAP caller 212 may be an individual that is calling an emergency number to request service. The service may be a request for a response to an immediate emergency (e.g. medical, fire, criminal, etc.). The request may be of an informational nature (e.g. reporting suspicious activity without a defined incident).

Public safety access point 250 may be a location, such as a call center, where calls to the emergency number are received. PSAP 250 may be staffed with personnel who have many different roles and responsibilities. For example, call taker 260 may be a PSAP staff member that is responsible for communicating with PSAP caller 212. Call taker 260 may answer calls, obtain information from the callers, maintain records of calls, end engage with other personnel, both within and outside of PSAP 250 to resolve calls to the PSAP.

External agency 214 represents agencies outside of PSAP 250 that may need to be informed/consulted with in order to resolve incoming calls to the PSAP. For example, PSAP caller 212 may be calling to report a downed power line. Call taker 260 may need to consult with an external agency (e.g. the electric company) in order to resolve the call. Although a specific example of an external agency is provided, it should be understood that external agency 214 represents any entity external to PSAP 250 that may be communicated with in order to resolve a call from PSAP caller 212. PSAP caller 212, external agency 214, and call taker 260 may all communicate over telephone network 220. Telephone network 220 is not limited to any particular type of network. It may be a wired or wireless network using either circuit or packet switched technology. What should be understood is that telephone network 220 may be used for audio communication.

PSAP 250 may also include dispatcher 270. Dispatcher 270 may be responsible for receiving information from call taker 260 and other sources with PSAP 250 and relaying that information to first responder 240. Dispatcher 270 may also be responsible for receiving information from first responder 240 to determine if other actions, such as dispatch of additional first responders, is needed. Dispatcher 270 may also be responsible for monitoring the availability of first responders to be dispatched. Dispatcher 270 may communicate with first responder 240 over radio network 235. For example, a PSAP may communicate with first responders over a wireless Land Mobile Radio (LMR) wireless radio network. It should be understood that radio network 235 represents any network that may allow dispatcher 270 to communicate with first responder 240. The techniques described herein are applicable regardless of the type of network used to communicate with first responder 240.

First responder 240 may be any type of agency that has field personnel that may respond to calls received at the PSAP. Some examples of first responders may include police personnel, fire personnel, and emergency medical services personnel. It should be understood that although several examples of types of first responders are provided, the techniques described herein are not limited to these examples.

Public safety access point 250 may also include Artificial Intelligence bot 280. AI bot 280 may be an active machine learning bot that implements the techniques described herein. AI bot 280 may be implemented on a device such as the one depicted with respect to FIG. 5. AI bot 280 may follow rules such as those set forth with respect to FIGS. 3 and 4 in order to implement the techniques described herein. AI bot 280 may be coupled to telephone network 220. AI bot 280 may use telephone network 220 to monitor all communications occurring between PSAP caller 212, external agency 214, and call taker 260.

AI bot 280 may be coupled to radio network 235. AI bot 280 may use radio network 235 to monitor all communications occurring between first responder 240 and dispatcher 270. AI bot 280 may also be coupled to all communication sources within PSAP 250 such that AI bot 280 may monitor communications between personnel within the PSAP. For example, AI bot 280 may be able to monitor communications between call taker 260 and dispatcher 270. In addition, AI bot 280 may be coupled to data network 230. Data network 230 may be a network such as the Internet. AI bot 280 may access data sources such as social media and online news sources through data network 230. Operation of AI bot 280 is described in further detail below.

Although environment 200 has been described in terms of a single PSAP caller 212, external agency 214, first responder 240, call taker 260, dispatcher 270, and artificial intelligence bot 280, it should be understood that this is for ease of description only. In an actual implementation, there may be many of each of the previously described entities. For example, there may be multiple incoming calls from different PSAP callers 212. Likewise, there may be multiple call takers 260 and dispatchers 270. AI bot 280 may also be implemented such that each individual incoming call has the functionality of AI bot 280 available to it. That functionality may be implemented using a separate instance of an AI bot for each call or by using a single instance of an AI bot to handle multiple calls. Furthermore, it should be understood that regardless of how implemented, each AI bot may have access to the data of all other AI bots.

In operation PSAP caller 212 may make a call to public safety access point 250 by using telephone network 220. The incoming call at PSAP 250 may be answered by call taker 260. In addition, AI bot 280 may be monitoring the incoming call. As the PSAP caller 212 and call taker 260 initially communicate, AI bot 280 may establish a baseline context for the call. For example, PSAP caller 212 may be speaking in a calm measured tone which may be considered the baseline context for this particular call. In another case PSAP caller 212 may be speaking in a highly agitated manner (e.g. screaming, heavy breathing, etc.) which may also be used to establish a baseline context. As will be explained in further detail below, AI bot 280 may use the baseline context to identify changes in the context of the call. Changes in context of a call may indicate further action is needed.

At some point, it may be necessary for call taker 260 to place PSAP caller 212 on hold. For example, call taker 260 may need to communicate with dispatcher 270 in order to instruct dispatcher 270 to use radio network 235 to dispatch first responder 240 to the caller's location. It should be understood that in some cases, call taker 260 and dispatcher 270 may be the same person and that the call may be placed on hold in order to allow call taker 260 to communicate with first responder 240. As another example, call taker 260 may need to communicate with external agency 214 over telephone network 220 in order to resolve the PSAP caller's 212 reason for calling. The particular reason that the PSAP caller is placed on hold is relatively unimportant.

AI bot 280 may monitor the context of the incoming call from PSAP caller 212 in order to detect a change from the baseline context that was previously determined. A change in context may indicate that there is information that needs to be conveyed to PSAP caller 212 (or that PSAP caller 212 needs to convey to call taker 260).

AI bot 280 may monitor incoming audio from PSAP caller 212 received over telephone network 220. For example, in a straightforward case, call taker 260 may provide PSAP caller with an emergency word or phrase (e.g. "Emergency Escalation") that the PSAP caller 212 may use to indicate that the PSAP caller's situation has changed and that he needs to be taken off hold immediately. AI bot 280 may monitor the PSAP caller's communication in order to detect the emergency word or phrase, and if detected, may trigger a process to take the caller off hold and reconnect the caller to a call taker. The process for reconnecting a caller to a call taker is described in further detail below.

AI bot 280 may also use natural language processing to detect changes in a caller's context. For example, incoming speech from the caller may be analyzed to detect words or phrases or sentiments that may indicate a change in the caller's context that may need to be addressed. For example, if the caller says, "He has a gun!" the AI bot may determine that there has been a change in the caller's context (e.g. additional information useful to the call taker—presence of a gun—is now available).

AI bot 280 may also monitor the caller's audio for changes from the baseline context. For example, if the baseline context of the caller was calm, and the caller suddenly begins screaming, this may indicate a change in the caller's context (e.g. caller has gone from calm to agitated). The reverse may also be true. A caller that was originally screaming, but has now become quiet may also indicate a change in context (e.g. agitated caller has suddenly become calm).

In addition to monitoring incoming audio generated by the caller, AI bot 280 may also monitor incoming background sounds. For example, AI bot may be listening for the sound of gunshots, fires, loud crowds that were not present in the baseline context, screaming not present in the original baseline, or any number of other changes in background sounds received from the caller. The AI bot may determine if changes in certain background sounds indicate a change in the caller's context and if so may initiate the process to take the caller off hold.

It should also be noted that AI bot 280 may also communicate with the caller during periods of time the caller is on hold in order to obtain pertinent information. For example, the AI bot may query the caller for background information, such as name, address, telephone number, date of birth, etc. The AI bot may also query the caller for other information pertinent to the reason for the call. For example, if the caller is reporting a robbery, the AI bot may query the caller about details of the suspect (e.g. height, weight, etc.). The AI bot may summarize this pertinent information and provide it to the call taker without requiring the call taker to take the caller off hold. For example, the call taker may place the caller on hold in order to being the process of dispatching first responders to the caller's location. As the AI bot summarizes the pertinent information received from the caller, that information may be presented to the call taker in text form, allowing the call taker to relay that information to first responders. This can be accomplished without taking the call off hold.

It should also be noted that the information flow may be bidirectional. Call taker 260 may have information to provide to caller 212 but may currently be occupied with other tasks. Call taker 260 may relay such information to AI bot 280 and the AI bot may relay that information to the caller. For example, call taker 260 may also be acting as dispatcher 270 and receives information about a criminal suspects location, which may be in the same location as the caller. Call taker 260 may provide instructions to the AI bot which may then relay those instructions to the caller (e.g. suspect has been spotted near your location, run away if possible). Call taker is able to relay this information to the caller without having to stop communicating with the first responders by taking the caller off hold.

In addition to monitoring communications from the caller, AI bot 280 may also monitor all communications associated with the PSAP. This may include all communications between personnel at the PSAP (e.g. call takers, dispatchers), first responders, external agencies, and any other communications associated with the PSAP. It should be understood that monitoring of communications associated with the PSAP 250 includes all communications, not just communications directly related to a specific call. AI bot 280 may monitor such communications for information that may be relevant to the caller's context. If the AI bot determines that information relevant to a change in the caller's context has been detected, the AI bot may initiate the process to take the caller off hold.

In addition to monitoring communications associated with the PSAP 250, AI bot 280 may also monitor external information sources, such as social media and news sources to gather information that may be related to the caller's context. AI bot may also monitor video feeds, such as those produced by mobile (e.g. body worn cameras, vehicle mounted cameras, etc.) and fixed cameras (e.g. security cameras, closed circuit television cameras, etc). AI bot 280 may utilize data network 230 in order to monitor external sources. For example, AI bot 280 may use external network 230 to monitor social media (e.g. Twitter, Facebook, etc.) to determine if there is information related to the caller's context available. AI bot may also use data network 230 to monitor news sources (e.g. 24-hour news networks, local news shows, newspapers) to determine if there is information related to the caller's context available. AI bot may also use data network 230 to monitor video feeds, such as those produced by both mobile and fixed surveillance cameras.

For example, the caller may be in a location and is reporting a suspicious crowd gathering. The caller may be placed on hold. While the caller is on hold., there may be a flurry of activity on external news sources (e.g. Twitter trending topics, breaking news, etc.) related to the location, such as a riot is in progress. AI bot 280 may utilize this information as a trigger to begin the process to take the caller off hold.

Once AI bot 280 has made a determination to take the caller off hold, AI bot may provide a recommendation to the call taker informing the call taker that the call should be taken off hold. The recommendation may include the reason why the AI bot is recommending the call be taken off hold (e.g. gunshots detected, associated PSAP communications, social media input, etc.). The call taker may use review the reason why the AI bot is recommending the call be taken off hold. If the call taker agrees with the recommendation, the call may be taken off hold by connecting the caller to the call taker. The call taker may then convey the necessary information (e.g. "we heard gunshots, are you ok?", "officer reporting riot in your area, run away if possible", "Twitter indicates a riot near you, hide if possible," etc.).

In some cases, the call taker may agree that there is information to be provided to the caller, but it may not warrant reconnecting the caller to the call taker. Instead, the information may be relayed to the call taker directly by the AI bot. For example, the AI bot may detect PSAP communications related to a riot forming near the caller's location. The AI bot may recommend that the caller be taken off hold, with the reason being communications associated with the PSAP indicate a riot forming in the location of the caller. The call taker may agree that the caller should be notified, and may instruct the AI bot to notify the caller. The AI bot may then notify the caller directly, without having to connect the caller to the call taker (e.g. AI bot says, "A riot may be forming in your area. Please use the emergency escalation word if you need immediate assistance.").

It should be noted that the AI bot provides a recommendation that the call should be taken off hold. In some cases, the AI bot recommendation may be incorrect. For example, a caller may be watching a fireworks show, and the AI bot detects gunshots and recommends the caller be taken off hold. The call taker may understand that the caller is calling from a fireworks show, and that the sounds detected are not gunshots. As such, the AI bot recommendation to take the call off hold may be rejected. The indication of an incorrect recommendation may be used by the AI bot to actively learn from previous calls. As such, the AI bot can use such feedback to continue to refine its models that are used for determining when a recommendation to take a call off hold should be made.

Figure 3:
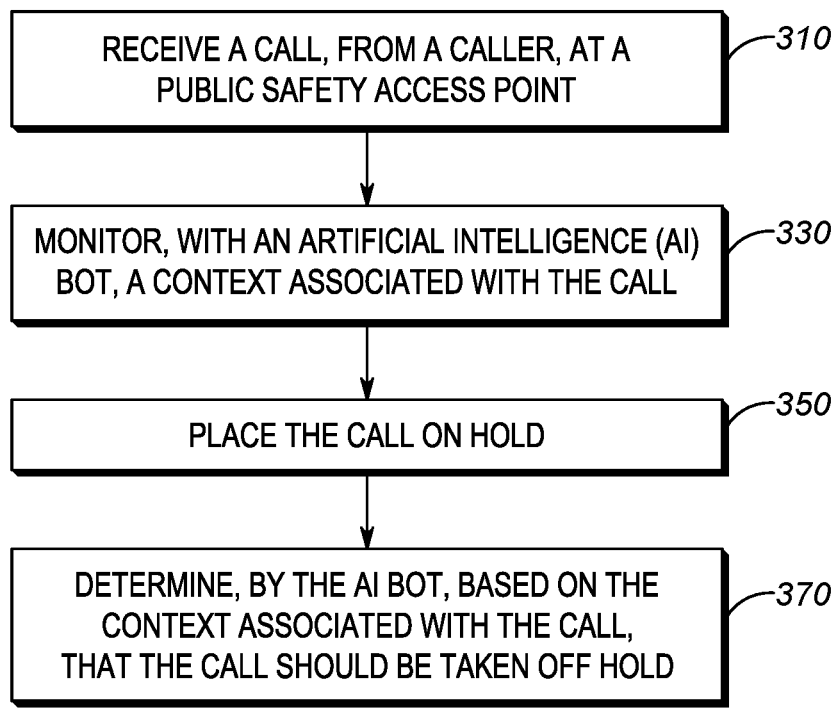
FIG. 3 is an example flowchart of a method of handling on hold calls using artificial intelligence.

FIG. 3 is an example flowchart of a method of handling on hold calls using artificial intelligence. In block 310 a call, from a caller, may be received at a public safety access point. For example, the call may be from a concerned member of the public reporting suspicious activity, without having a clearly articulable emergency situation to report. As another example, the call may be from a person experiencing an acute emergency situation (e.g. threat to personal safety, medical emergency, fire, etc.) that may require an urgent response. Other example calls may be more urgent than simple reporting, but less urgent than an acute emergency situation.

In block 330, an Artificial Intelligence (AI) bot may monitor a context associated with the call. As mentioned above, there are many inputs related to the context of a call. For example, sounds being received from the caller. These sounds include not only the things the caller says, but also include background sounds. Monitoring may also include monitoring communications associated with the PSAP to determine the context of the call. For example, the AI bot may monitor all communication associated with the PSAP (e.g. communications from other call takers, dispatchers, field personnel, etc.) to determine if any of the content of such communications are relevant to the context of the call. Monitoring may additionally include monitoring external data sources, such as social media and online news sources, for example, for information that may be related to the caller's context. For example, social media feeds (e.g. Twitter, Facebook, etc.) and online news sources may be monitored for information related to the caller's context.

In block 350, the call may be placed on hold. As explained previously, personnel in PSAPs may perform many different roles with different responsibilities. At times, a caller may be placed on hold while the PSAP personnel attend to other duties, which may also include answering new, incoming calls. In some cases, low priority calls (e.g. calls reporting non-critical events) may be placed on hold until higher priority calls (e.g. emergencies requiring immediate attention) are resolved.

In block 370, it may be determined, by the AI bot, based on the context associated with the call, that the call should be taken off hold. In block 330, the AI bot is monitoring the context associated with the call. Based on that context, the AI bot may determine that the call should be taken off hold. For example, the context of the call may have changed such that there is new information to provide to and/or from the caller.

Figure 4:
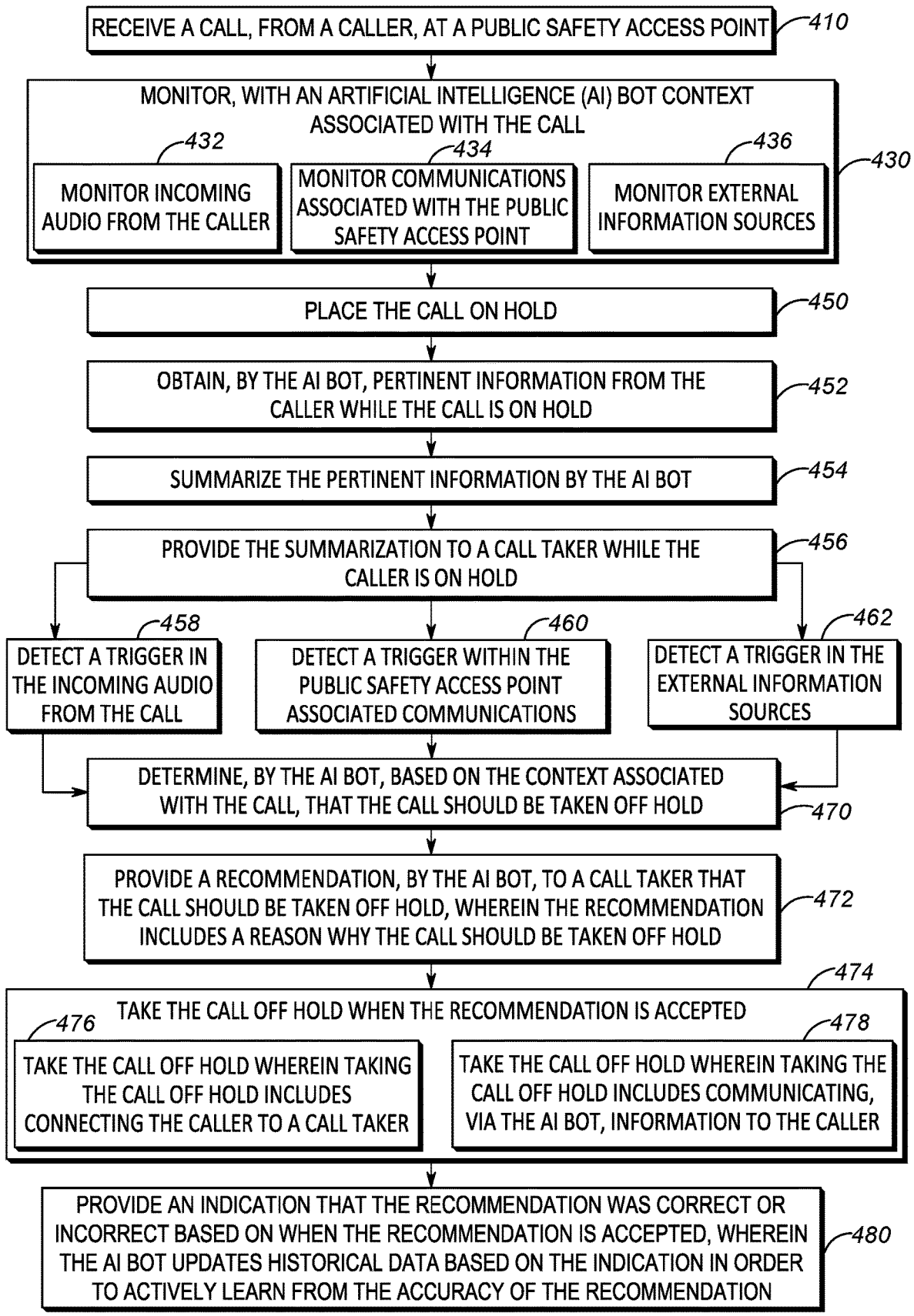
FIG. 4 is another example flowchart of a method of handling on hold calls using artificial intelligence.

FIG. 4 is another example flowchart of a method of handling on hold calls using artificial intelligence. In block 410, just as in block 310, a call may be received from a caller at a public safety access point. In block 430, just as in block 330, an Artificial Intelligence (AI) bot may monitor the context associated with the call.

Monitoring the context of the call may include monitoring various sources of information associated with the call. In block 432, incoming audio from the caller may be monitored. The incoming audio may include sounds the caller makes (e.g. utterance of an escalation word, caller screaming, or other audio inputs originating from the caller). Monitoring incoming audio may also include monitoring sounds in the caller's background noise (e.g. gunshots, sounds of fire, sounds of a mob of people, and any other sounds received from the caller's environment).

In block 434 communications associated with the public safety access point may be monitored. For example, personnel at the PSAP are in communication with other callers, field personnel, and each other. These communications may be monitored to determine if any of the content associated with those communications is pertinent to a call that the AI bot is monitoring. For example, a call taker who is unassociated with the call received in block 410 may be communicating with field personnel. The communication may include information related to the caller's location (e.g. foot pursuit of a suspect at that location). Although this communication was not directed to the caller, the information contained therein may be relevant to the caller's context.

In block 436, external information sources may be monitored. As explained above, there are many external sources of real time and near real-time information (e.g. Social Media, Twitter, citizen journalist's, etc.) These external information sources may be monitored by the AI bot to determine if any of the monitored communications are relevant to the received call. For example, a trending topic on Twitter may indicate a riot beginning to form at a certain location. If that location is near the caller's location, such information may impact the caller's context.

In block 450, just as in block 350, the call may be placed on hold. As above, the call may be placed on hold for any number of reasons, including that the call taker needs to attend to other duties. In block 452, pertinent information may be obtained from the caller, by the AI bot, while the call is on hold. As explained above, the AI bot may use an interactive voice system to obtain information from the caller. Such information could be general background information (e.g. name, address, date of birth). Such information could also be more directly related to the purpose of the call (e.g. what color shirt was the suspected thief wearing). By using the AI bot to obtain such information, the call taker is free to handle other duties.

In block 454, the pertinent information may be summarized by the AI bot. In some cases, the summary may simply be a speech to text transcription of the information gathered from the caller. In other cases, the summary may involve the AI bot processing the caller's input to identify the specific pieces of information that are pertinent. For example, a caller may provide a rambling description of a suspect. The AI bot may process this description to extract the pertinent details (e.g. suspect height, weight, age, etc.).

In block 456 the summarization may be provided to a call taker while the call is on hold. For example, if the AI bot has obtained information related to a suspect's description from the caller while the call was placed on hold, a text representation of that description may be provided to the call taker. As another example, if the AI bot has obtained video of the suspect, the video, or an still frame of the video, may be provided to the call taker. As another example, the summarization may also include portions of the audio received by the AI bot. The call taker may then relay this information to others (e.g. first responders) without having to take the caller off hold.

In block 458, a trigger may be detected in the incoming audio from the call. As explained above, the AI bot may monitor the incoming audio from the caller to determine if the caller's context has changed. A trigger may be detected in the incoming audio indicating that the caller's context has changed.

In block 460, a trigger may be detected within the public safety access point associated communications. As mentioned in block 434, communications associated with the public safety access point may be monitored, even if those communications are not directly generated due to the caller. If communications associated with the PSAP as a whole are relevant to the caller's context, a trigger may be detected in those communications.

In block 462, a trigger may be detected in the external information sources. As mentioned in block 436, external information sources may be monitored for information related to the caller's context. A trigger may be detected if information related to the caller's context is found in the external information sources.

In block 470, the AI bot may determine, based on the context associated with the call, that the call should be taken off hold. For example, the caller's context may have changed such that it is now necessary to take the caller off hold in order to provide additional information to the caller. The change in context may come from the trigger detection blocks 458, 460, 462.

In block 472 the AI bot may provide a recommendation to a call taker that the call should be taken off hold. The recommendation may include a reason why the call should be taken off hold. In some implementations, the AI bot will provide a recommendation that a call should be taken off hold, and the reason why the AI bot has determined that the call should be taken off hold. The call taker may then have the final say on whether or not to accept the AI bot recommendation. In some cases, the recommendation may not be accepted because the AI bot may have incorrectly determined that the caller's context had changed, when in fact it had not changed. For example, the AI bot may have incorrectly determined that a historical social media post (e.g. one year ago today, a crime was committed) as current, real time events. A human call taker would notice that the post refers to historical, not real time, events, and could ignore the AI bot recommendation.

In block 474 the call may be taken off hold when the recommendation is accepted. If the call taker agrees that the caller's context has changed, such that new information is to be provided to the caller, the call may be taken off hold in order to convey that information. In block 476 taking the call off hold may include connecting the call to a call taker. It should be noted that the call is not required to be connected to the original call taker. It is possible that a different call taker within the PSAP is now available. As such, the call may be taken off hold and connected to a call taker that is free. The call may also be reconnected to the original call taker.

In block 478 taking the call off hold may include communicating, via the AI bot, information to the caller. For example, the AI bot may have determined that the caller's context has changed such that the caller's current location is no longer safe. The AI bot may communicate with the caller (e.g. using a voice interaction system) by sending a message instructing the caller to flee the location. By having the AI bot communicate directly with the caller, the call taker can remain free to perform other tasks.

In block 480, an indication may be provided that the recommendation was correct or incorrect based on then the recommendation is accepted. The AI bot may update historical data based on the indication in order to actively learn from the accuracy of the recommendation. In other words, if the AI bot's recommendation from block 472 is not accepted, this may indicate that the AI bot has incorrectly determined that the call should be taken off hold. This historical information may be stored in a database and be used by the AI bot to actively learn and improve its recommendations. For example, if a recommendation to take a call off hold is not accepted, and a similar set of circumstances is encountered in the future, the AI bot may utilize the historical data to determine that there should not be a recommendation to take the call off hold.

It should be understood that the AI bot may actively learn as more and more calls are handled. Although the description above includes the AI bot providing a recommendation to a human call taker, the techniques described herein are not so limited. In some implementations, the AI bot may determine that a call should be taken off hold and immediately takes the call off hold, by either reconnecting the call to the call taker, or providing additional information to the caller directly.

Figure 5:
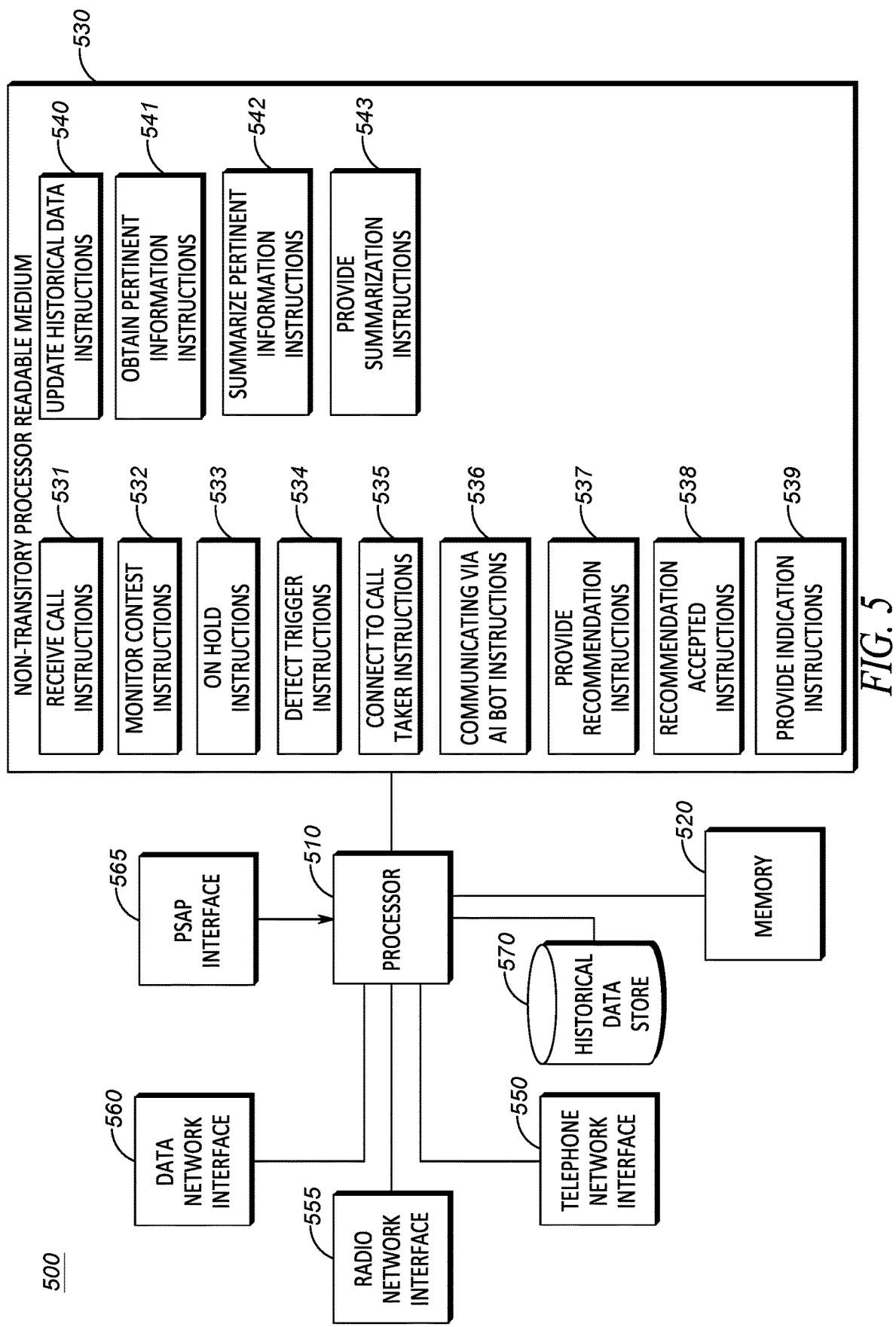
FIG. 5 is an example of a block diagram of a processor platform that may execute instructions to implement a system that may be used to handle on hold calls using artificial intelligence.

FIG. 5 is an example of a block diagram of a processor platform that may execute instructions to implement a system that may be used to handle on hold calls using artificial intelligence. Platform 500 may include a processor 510, a memory 520, a non-transitory processor readable medium 530, a telephone network interface 550, a radio network interface 555, a data network interface 560, a PSAP interface 565, and a historical data store 570.

Processor 510 may be any type of processor that may execute instructions that cause processor platform 500 to implement the techniques described herein. Processor 510 may be coupled to memory 520 which may store instructions executed by the processor 510. In some implementations, memory 520 may be a volatile random access memory (RAM), although the techniques described herein are not dependent on any specific type of memory. Processor 510 may cause memory 520 to be loaded with processor 510 executable instructions that implement the techniques described herein. In some implementations, processor 510 may load memory 520 with instructions stored on non-transitory processor readable medium 530. Non-transitory processor readable medium 530 is described in further detail below.

Processor 510 may be coupled to telephone network interface 550. As described above, AI bot 280 which is included as part of PSAP 250 may have a connection to a telephone network 220. The connection to telephone network 220 may allow AI bot 280 to monitor calls that are received by PSAP 250. In addition, the connection to telephone network 220 may allow the AI bot 280 to communicate directly with callers. Processor 510 may access telephone network 220 through telephone network interface 550.

Processor 510 may be coupled to radio network interface 555. As described above, AI bot 280 which is included as part of PSAP 250 may have a connection to a radio network 235. The connection to radio network 235 may allow AI bot 280 to monitor radio traffic between the PSAP and field personnel. Processor 510 may access radio network 235 through radio network interface 555.

Processor 510 may be coupled to data network interface 560. As described above, AI bot 280 which is included as part of PSAP 250 may have a connection to a data network 230. The connection to data network 230 may allow AI bot 280 to monitor external data sources. Processor 510 may access data network 230 through radio network interface 555.

Processor 510 may be coupled to PSAP interface 565. As described above, AI bot 280 which is included as part of PSAP 250 may have a connection to communications associated with the PSAP. For example, communications with external agencies 214, call takers 260, dispatchers 270, and others (not shown) within the PSAP may be monitored by AI bot 280 in order to monitor information related to the context of an incoming call. Processor 510 may access communications associated with the PSAP through PSAP interface 565.

Processor 510 may be coupled to historical data store 570. Historical data store 570 may contain data related to prior decisions made by AI bot 280 to recommend a call be taken off hold, and if that prior decision was correct. Such information may be stored in historical data store 570 and may be used by AI bot 280 in order to actively learn from previous decisions.

Processor 510 may also be coupled to non-transitory processor readable medium 530. Medium 530 may contain a set of instructions thereon that when executed by a processor 510 cause the processor to implement the techniques described herein. It should be understood that the instructions stored on medium 530 collectively implement the AI bot 280.

Medium 530 may include receive call instructions 531. Receive call instructions 531 may be used by processor 510 to receive calls coming into PSAP 250. Receive call instructions 531 may utilize telephone network interface 550 in order to receive calls coming from the telephone network. Medium 530 may include monitor context instructions 532. Monitor context instructions 532 may be used by processor 510 to monitor various sources of information that relate to a caller's context. As explained above, such information can include audio input from the caller obtained through telephone network interface 550, communications associated with the PSAP obtained through radio network interface 555 and PSAP interface 565, and external information obtained through data network interface 560.

Medium 530 may also include on hold instructions 533. On hold instructions may be used by processor 510 to place an incoming call on hold. Medium 530 may also include detect trigger instructions 534. Detect trigger instructions 534 may be used to detect when input from the monitor context instructions 532 have indicated a change in the context of an incoming call. Processor 510 may use detect trigger instructions 534 to determine when a change in a caller's context has occurred. Medium 530 may also include connect to call taker instructions 535. As noted above, in some cases, a caller may be taken off hold and returned to the call taker. Processor 510 may use connect to call taker instructions 535 to take a call off hold and connect it to a call taker.

Medium 530 may also include communicating via AI bot instructions 536. As mentioned above, in some cases, AI bot 280 may take the caller off hold and communicate information directly to the caller. Processor 510 may use communicating via AI bot instructions 536 in order to communicate directly with the caller.

Medium 530 may also include provide recommendation instructions 537. As mentioned above, AI bot 280 may make a recommendation to the call taker that a call should be taken off hold based on a change in context of the call. Provide recommendation instructions may be active machine learning instructions in which AI bot 280 may use previous recommendations to actively improve its recommendation decisions. Processor 510 may use provide recommendation instructions 537 to implement an active machine learning AI bot 280.

Medium 530 may include recommendation accepted instructions 538 to receive an indication that the call taker has accepted the AI bot's recommendation to take the call off hold. Processor 510 may use recommendation accepted instructions 538 to take the caller off hold when the recommendation to take the caller off hold is accepted. Medium 530 may also include provide indication instructions 539. Provide indication instructions 539 may be used to determine if the recommendation provided by the AI bot was correct. If the recommendation was accepted, the recommendation may be considered correct. If the recommendation was not accepted, the recommendation may be considered incorrect. Processor 510 may use provide indication instructions 539 to determine if the recommendation was correct.

Medium 530 may include update historical data instructions 540. Update historical data instructions 540 may be used to store and indication of if the recommendation of the AI bot was correct or incorrect. Such historical data may be used in an active machine learning process in order for the AI bot to improve its performance by actively learning from the handling of previous calls. Processor 510 may use update historical data instructions 540 to keep a record of the accuracy of previous recommendations in order to further train, using active machine learning, AI bot 280.

Medium 530 may also include obtain pertinent information instructions 541. As described above, AI bot 280 may communicate with a caller while the caller is on hold to obtain information pertinent to the call. Processor 510 may use obtain pertinent information instructions 541 to gather information from a caller. Medium 530 may include summarize pertinent information instructions 542. Processor 510 may use summarize pertinent information instructions 542 to summarize the information provided by the caller. Medium 530 may include provide text representation instructions 543. Processor 510 may use provide text representation instructions 543 in order to provide a textual summary of information obtained by AI bot to a call taker.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of on hold handling of calls comprising:
   receiving a call, from a caller, at a public safety access point;
   monitoring, with an Artificial Intelligence (AI) bot implemented by a processor, an incoming audio associated with the call;
   placing the call on hold;
   determining, by the AI bot, based on the incoming audio, that the call should be taken off hold;
   providing a recommendation, by the AI bot, to a call taker that the call should be taken off hold, wherein the recommendation includes a reason why the call should be taken off hold;
   taking the call off hold when the recommendation is accepted; and
   providing an indication that the recommendation was correct or incorrect based on when the recommendation is accepted, wherein the AI bot updates historical data based on the indication in order to actively learn from the accuracy of the recommendation.

2. The method of claim 1 wherein monitoring the incoming audio associated with the call further comprises:
   monitoring the incoming audio to establish a baseline context for the call.

3. The method of claim 2 wherein determining that the call should be taken off hold further comprises:
   detecting a trigger in the incoming audio from the call, wherein the trigger indicates a change in the baseline context of the call.

4. The method of claim 3 wherein the change in the baseline context of the call further comprises:
   a change in level of agitation of the caller.

5. The method of claim 3 wherein the change in the baseline context of the call further comprises:
   a change in background noises from the caller.

6. The method of claim 3 wherein the change in the baseline context of the call further comprises:
   detection of a call taker provided emergency word in the incoming audio.

7. A non-transitory processor readable medium containing a set of processor executable instructions thereon that when executed by a processor cause the processor to:
   receive a call, from a caller, at a public safety access point;
   monitor, with an Artificial Intelligence (AI) bot implemented by a processor, an incoming audio associated with the call;
   place the call on hold;
   determine, by the AI bot, based on the incoming audio, that the call should be taken off hold;
   provide a recommendation, by the AI bot, to a call taker that the call should be taken off hold, wherein the recommendation includes a reason why the call should be taken off hold;
   take the call off hold when the recommendation is accepted; and
   provide an indication that the recommendation was correct or incorrect based on when the recommendation is accepted, wherein the AI bot updates historical data based on the indication in order to actively learn from the accuracy of the recommendation.

8. The medium of claim 7 wherein the instructions to monitor the incoming audio associated with the call further comprises instructions to:
   monitor the incoming audio to establish a baseline context for the call.

9. The medium of claim 8 wherein the instructions to determine that the call should be taken off hold further comprises instructions to:
   detect a trigger in the incoming audio from the call, wherein the trigger indicates a change in the baseline context of the call.

10. The medium of claim 9 wherein the change in the baseline context of the call further comprises:
    a change in level of agitation of the caller.

11. The medium of claim 9 wherein the change in the baseline context of the call further comprises:
    a change in background noises from the caller.

12. The medium of claim 9 wherein the change in the baseline context of the call further comprises:
    detection of a call taker provided emergency word in the incoming audio.

13. A system comprising:
    a processor; and
    a memory coupled to the processor, the memory containing a set of instructions that when executed by the processor cause the processor to:
    receive a call, from a caller, at a public safety access point;
    monitor, with an Artificial Intelligence (AI) bot implemented by a processor, an incoming audio associated with the call;
    place the call on hold;
    determine, by the AI bot, based on the incoming audio, that the call should be taken off hold;
    provide a recommendation, by the AI bot, to a call taker that the call should be taken off hold, wherein the recommendation includes a reason why the call should be taken off hold;
    take the call off hold when the recommendation is accepted; and
    provide an indication that the recommendation was correct or incorrect based on when the recommendation is accepted, wherein the AI bot updates historical data based on the indication in order to actively learn from the accuracy of the recommendation.

14. The system of claim 13 wherein the instructions to monitor the incoming audio associated with the call further comprises instructions to:
    monitor the incoming audio to establish a baseline context for the call.

15. The system of claim 14 wherein the instructions to determine that the call should be taken off hold further comprises instructions to:
    detect a trigger in the incoming audio from the call, wherein the trigger indicates a change in the baseline context of the call.

16. The system of claim 15 wherein the change in the baseline context of the call further comprises:
    a change in level of agitation of the caller.

17. The system of claim 15 wherein the change in the baseline context of the call further comprises:
    a change in background noises from the caller.

* * * * *